United States Patent [19]
de Lima

[11] Patent Number: 5,694,888
[45] Date of Patent: Dec. 9, 1997

[54] FUEL CONSUMPTION OPTIMIZER AND EXHAUST EMISSIONS REDUCER BASED ON AN AIR-VACUUM LIQUID COMPENSATION SYSTEM

[76] Inventor: Tito de Lima, Calle Terepaima, Quinta Montserrat, Urb. El Marquez, Caracas 1070, Venezuela

[21] Appl. No.: 580,008

[22] Filed: Dec. 20, 1995

[30] Foreign Application Priority Data

Dec. 21, 1994 [VE] Venezuela ..................... 001982

[51] Int. Cl.$^6$ .................................................. F02B 43/00
[52] U.S. Cl. .................................. 123/1 A; 123/587
[58] Field of Search ........................ 123/587, 590, 123/1 A

[56] References Cited

U.S. PATENT DOCUMENTS

| | | | |
|---|---|---|---|
| H1466 | 8/1995 | Stapf ............................. | 123/585 |
| 3,961,609 | 6/1976 | Gerry ............................. | 123/1 A |
| 4,167,166 | 9/1979 | Varner et al. ................... | 123/543 |
| 4,172,438 | 10/1979 | MacGuire ....................... | 123/585 |
| 4,194,477 | 3/1980 | Sugiyama ....................... | 123/327 |
| 4,235,209 | 11/1980 | Ibbott ............................ | 123/586 |
| 4,373,500 | 2/1983 | Haynes .......................... | 123/587 |
| 5,154,142 | 10/1992 | Kamo ............................ | 123/1 A |
| 5,190,014 | 3/1993 | Suga et al. .................... | 123/519 |
| 5,313,926 | 5/1994 | Lin ................................. | 123/587 |
| 5,540,190 | 7/1996 | Rogers et al. .................. | 123/525 |
| 5,555,852 | 9/1996 | Reymanandt, IV ............. | 123/1 A |

FOREIGN PATENT DOCUMENTS 1590605  9/1990  U.S.S.R. .

OTHER PUBLICATIONS

Venezuelan Abstract of "Fuel Vaporization Device", James E. Gilmore, Appln. No. 85-0978, Oct. 12, 1988.
Venezuelan Abstract of "Fuel Control System", Peter R. Smith Appn. No. 85-1620, May 31, 1989.
Venezuelan Abstract of "Device to Control the Air Entrance", S.H. Faull, Appln. No. 92-1100, Jul. 10, 1992.

*Primary Examiner*—David A. Okonsky
*Attorney, Agent, or Firm*—Keck, Mahin & Cate

[57] ABSTRACT

A fuel consumption optimizer and exhaust emissions reducer for an internal combustion engine including an air-vacuum liquid compensation device has a device for supplying a first stream of air at high speed and a second stream of air at high volume through respective channels into a booster container and a device for passing the first stream of air and the second stream of air through a plurality of openings in the respective channels into a body of liquid in the booster container. A method is described for optimizing fuel consumption and reducing exhaust emissions in an internal combustion engine.

13 Claims, 3 Drawing Sheets

FUEL CONSUMPTION OPTIMIZER AND EXHAUST EMISSIONS REDUCER BASED ON AN AIR-VACUUM LIQUID COMPENSATION SYSTEM

FIELD OF THE INVENTION

The present invention concerns internal combustion engines, and more particularly, this invention refers specifically to the optimal reduction of fuel consumption derived from the increase of volumetric and combustion efficiencies, produced by high volumes of additional air supplied through intake manifold, while reducing the negative work and vacuum effort of pistons. All of which allow a simultaneous reduction of fuel and a noticeable power boost. The system is intended to work for internal combustion engines in general (A), where a vacuum negative pressure is the responsible factor for aspiration. Air stream is drawn from ambient air, through the fuel dispensing system (B) to form with any fuel (C) the corresponding air-fuel mixture and carry it to the combustion chamber.

BACKGROUND OF THE INVENTION

1. Definition of Terms

A) internal combustion engines in general: refers to engines of 2 or 4 time cycles, where fuel does not partake in a lubricant function also excludes turbo charged engines.

B) Any fuel dispensing system: carburetor, injection or mixer dosifier of air-natural gas, or air-LPG. This system is often referred to as a "delivery system".

C) Any fuel: gasoline, natural gas, (LPG) liquid petroleum gas, alcohols (methanol, ethanol, others), or mixtures of alcohol and gasoline, diesel, fuel oil.

2. Background Discussion

It is common knowledge that for a conventional combustion engine the ideal combustion could be defined by the relation between: the maximum amount of energy generated by the total combustion of a minimum volume of fuel, uniformly distributed in each cylinder, while a minimum production of solid residues and polluting emissions results. This definition would represent reaching 100% efficiency in a combustion process.

For the purpose of reaching a high degree of efficiency in the combustion and a significant reduction in the volume of fuel consumed by internal combustion engines, it is convenient to discriminate the essential factors of the combustion process, as well as the problems and limitations of operational designs inherent to the engines which will affect the internal combustion and engine performance.

3. Essential Factors

In order for combustion to take place, it is necessary to have the presence of two variables, without which it would be impossible for the process to take place: (A) fuel, (B) carburetant.

The variations applied to these factors, in separate or joint form, will engender negative/positive effects to the combustion and performance of the engine.

(A) THE FUEL

Our reference to factor (A), implies any volatile fuel, inflammable by the spark of the ignition, such as: gasoline, alcohols, natural gas, LPG, or gasoline-alcohol mixtures. In case any reference is made to diesel or fuel oil, we will make specific mention of them.

(B) THE CARBURETANT

Specifically refers to the oxygen, which is an indispensable element for enabling combustion to take place. Combustion is an oxidation process where the elements carbon and hydrogen are present in simple or complex chains of hydrocarbon fuels and, once burned produce carbon monoxide, carbon dioxide, and water. This oxidation reaction involves a high energy production. Due to the fact that its contribution is made as one fifth of the air volume (unless, supplied as a pure element by different devices), it would be convenient to make clear the meaning of certain terms to be used in the following analysis, making clear that every time these terms appear in this application, it should be understood, how and how much carburetant is supplied through this way or access.

Air.—Refers to the air entering into the combustion chamber through its natural restricted way of access, with the inconvenience that the air can only contribute 20% of oxygen, while it also includes an undesirable 80% of nitrogen.

Air-Oxygen. This term will apply to the additional supply of oxygen drawn from the ambient air, through an alternative access and which is injected in great volumes in order to obtain a significant value of one fifth additional oxygen.

Pure Oxygen. Will refer to the Oxygen supplied by some type of devices which normally imply certain limitations in terms of production, space, handling and storage.

Since the previously mentioned three terms deal specifically with the carburetant (B), from now on we will make reference individually, add the letter (B) as a reminder of their indispensable character for the combustion process.

LIMITATIONS OF THE OPERATIONAL DESIGN

This concerns the problems, restrictions and inconveniences related to design that affect negatively the appropriate supply of both factors (A) or (B), considering each of their particular deficiencies as they may affect the combustion process and final performance obtained from the engine. At this point we must make clear that such problems and limitations are subject to corrections and improvements, this we believe to be true and have made it one of the objects of this invention.

Main Limitation. It is well known that in most of the conventional combustion engines, the fuel (A) as well as the air (B), are supplied together by the fuel dispensing system, where the vacuum is responsible for the formation of an air current (B) intaking the vapor fuels (A) in order to transport it, mixed in the air current (B) for its later ignition in each cylinder of the combustion chamber. This joint supply of (A) and (B) creates an inconvenient interdependence between them, which at the end translates into limitations imputable not only to the design, but also to the way the engine performs and the fuel dispensing system operates using different acceleration and vacuum variables. Additionally, another important limitation should be considered. The inconvenience that represents supplying all the air (B) that passes through the fuel dispensing system, where the butterfly throttle and the air injectors obstruct and impose restrictions, that do not allow easy access to great volumes of air (B) which are indispensable to carry out the complete combustion of all the volume of fuel which was taken in and transported to each cylinder in the combustion chamber. Similarly, this restrictive and deficient supply of air (B) causes additional problems, such as defective vaporization of fuel (A), adherence of the liquid fuel to the elbows and walls of the intake manifold; irregular transportation and distribution of fuel (A) to each of the cylinders in the combustion chamber; rich mixture in fuel (A) in different operational conditions. All these problems translate into partial burning of fuel (A), resulting in certain portions of uncombusted fuel, which will form internal solid deposits (carbon) and contaminating emissions such as residual hydrocarbons and carbon monoxide expelled to the environment through the exhaust pipe. Also, the engine consumes a greater quantity of inefficient fuel wasted in producing residues and not in generating energy. As we have said before, this restrictive and inefficient air (B) supply only carries 20% of oxygen together with an unwanted 80% of nitrogen that under high temperatures of combustion combines with some of the oxygen, thereby forming nitrogen oxides (NOx emissions) contaminating elements. The formation of nitrogen oxides, also diminishes the already scarce 20% of natural oxygen found in air supply (B), thereby inhibiting even further the complete combustion of fuel (A), and increasing the presence of residual hydrocarbons (HC) and (CO) carbon monoxide, both of which are highly poisonous and contaminating.

All we have stated so far, indicates that the hard core of the problem is: the incomplete combustion and the waste of fuel (A) not burned due to the lack of carburetant oxygen (B); where the solution must be, to increase considerably the volume of air (B) taken in through normal admission ways. It is impossible to increase the air current (B), taken in through the fuel dispensing system, without producing simultaneously, the suction and dragging of an additional amount of fuel (A):

Consequently this explains the inconvenient interdependence of factors (A) and (B), as well as removing the possibility of supplying additional air-oxygen (B) by restricted normal intake. In conclusion, we can summarize that the engine is actually functioning in close conditions of high vacuum (−20 PSI), with a rich mixture of fuel (A) but lacking in carburetant oxygen (B), favoring an incomplete and inefficient combustion with a high wastage of non-burned fuel and a high production of residues, together with contaminating emissions expelled to the environment through the exhaust pine.

Having analyzed the possible implementation of certain, improvements in the carburetant (B) factor, applying them through its normal way of restricted admission, the results obtained are questionable.

Let us analyze the results in applying certain improvements in the fuel factor (A) per se:

It is obvious, that in order to reduce the consumption of fuel (A), the amount of fuel delivered by the fuel dispensing system should be reduced. To manage this, we must reduce the diameter of the passages located in the internal parts (gillets, venturis or injectors), through which the fuel runs in the fuel dispensing system. This way we would obtain a substantial reduction in the delivery of fuel (A). Such a reduction could be so noticeable, that we would find a restricted volume of air (B) always enough to carry out the combustion of all the reduced volume of fuel that enters the combustion chamber. It is certain that total combustion can be produced with a minimum production of residues and effluents. But, we must not forget that the power generated by the engine is proportional to the energy produced by explosion of the reduced fuel (A), all of which would imply a reduced production of energy thus generating less power. From the above we can derive that a reduction of fuel (A) per se implies a sacrifice in the power of the engine. Thus, any improvement applied to this fuel (A) factor, would be questionable and inconvenient due to the lack of use of the energetic capacity generating power.

In conclusion, the limitations and restrictions just mentioned, raise doubts on the possibility of reducing fuel consumption and improving the efficiency of a conventional engine after having improved fuel factors (A) and (B) although, without question, both fuel and carburetant are indispensable for combustion to take place.

In accordance of the above mentioned limitation,, the development and application of an alternate non-restrictive way to allow an additional and sufficient volume of air-oxygen (B) to promote a complete combustion of all the volume of fuel (A) that enters the combustion chamber, succeeding, at the same time in reducing the portions of non-burned fuel, as well as reducing the contaminating gases. This, in a nutshell, is the fundamental objective of this invention.

4. Brief Summary of Prior Art

During several years, numerous efforts have been made focused mainly in developing methods to reduce gasoline consumption, while improving the efficiency of the internal combustion engine and at the same time, reducing the contaminating emissions and black fumes which are expelled to the environment through the exhaust pipe. A great number of new techniques and a diversity of methods have been implemented and tested, in order to correct certain deficiencies such as incomplete vaporization of gasoline, fuel mixtures (richness or leanness) air-gasoline for different operational conditions given at the time of acceleration or its contrary action, irregular distribution of fuel in the cylinders, lack of air during acceleration, or insufficiencies of oxygen.

In order to overcome these deficiencies, various devices have been developed to generate micro-turbulence with air at sonic speeds, air pulsations with a variable frequency, vaporized hot air, air injections controlled by diaphragms, valves, pistons, or passages with narrow openings and small orifices. Other methods and devices inject pure oxygen, alone or mixed with air. After having analyzed each of these systems and devices in detail, it is possible to observe that none of them have been designed to reduce per se, the volume of fuel (A) that enters the combustion chamber. Nevertheless, we can observe that they allow the entrance of previously filtered ambient air in some cases at intervals and in other cases in a continuous pattern, while in yet other cases the ambient air is introduced using pressure. Most of these are connected below the fuel dispensing system, either through the positive crankcase ventilating valve of the car (PCV) or by the admission manifold. All of these methods ignore the inconvenience of the joint flow of air and fuel, which allows the intake of additional air (B). At this point it is convenient to point out that the prior art includes many inventions designed principally for reducing gasoline consumption by increasing the efficiency of the fuel combustion, or for promoting the combustion of a greater amount of fuel, or for reducing the non-burned fuel wasted as residues and contaminating emissions. It is necessary to have the presence of sufficient oxygen (B) carburetant which would be supplied by additional and considerable significant volumes of air (B) that must run through each device.

Therefore, it is pertinent to inquire why all the known devices impose conditions and restrictions to block the running of the necessary volume of additional air (B). Undoubtedly, this is contrary to the correct solution of the quest. The volume of fuel (A) additionally burned will be proportional to the volume or additional air-oxygen (B) that enters the inside of the combustion chamber incoming from the alternate way. The question arises, why make this alternate way restrictive to the flow of air (B) through the devices?

OBJECTS OF THE INVENTION

The allocation of a non-restrictive device that allows entry of sufficient volumes of additional air-oxygen, maximizing the efficiency of the combustion, but that at the same time allows a reduction of fuel usage without a loss of power, is another principal objective of the present invention.

The main reason for using reduced volumes of air is due to the fact that the undiscriminated entrance of great volumes or air would produce the sudden total decompensation of the negative pressure of vacuum (−20 PSI), by its abrupt annulment with the positive ambient pressure (+15 PSI), provoking defects and malfunctions of the decompensated engine. Since the normal way of access for a great volume of air entering the inside of an engine is to go through certain restrictions caused by throttle butterflies, located in the dispenser system, this would imply that the internal space of the engine is practically closed, causing the pistons to aspirate air from a close inner space during their downward displacement, resulting in a negative effort and work, that is to say an inefficient work which implies a waste and consumption of a good part of the energy generated by the explosion. The vacuum has the capacity to aspirate constantly variables volumes of air. This suction action is directly attributed to the internal displacement and the number of revolutions (RPM) made by the engine. Since the formation of the vacuum is constant, this implies a constant inefficiency and waste of working energy in each revolution of the engine.

From this we can assert that even if ideally a 100% efficiency could be reached during the combustion, the resulting power could never correspond to the power that could generated by 100% of the energy excerpted from the explosion.

The implementation of a device that would allow the constant supply of variable volumes of additional air-oxygen via the intake manifold, avoiding the internal decompensation, while facilitating the engine's operations in more open conditions to the atmosphere, allowing a significant reduction of the negative work of the pistons during the production of vacuum without the consumption of energy generated in the explosion which finally translates into an increase of torque and power. These also represent important concepts and are objects of the present invention.

To sum up, as has been previously expressed, it is possible to describe the combustion that takes place in any conventional engine as an incomplete process due mainly to the inadequate and restricted supply of ambient air which carries the carburetant oxygen which is absolutely necessary in variable volume, but always enough to carry out the total combustion of the variable volumes of any type of fuel delivered through any kind of dispensing system, in accordance with the operating conditions of the said engine.

In relation to this incomplete combustion there are several problems and limitations:

a. Insufficient and restricted air supply.
b. Non burned fuel consumption without any energy production.
c. High production of residues and contaminating emissions.
d. Close in conditions and internal engine high vacuum.
e. Negative work due to vacuum production.
f. Poor engine volumetric efficiency.
g. Irregular fuel distribution in the cylinders.
h. Loss of power due to fuel reduction.
i. Engine failures due to decompensation.

In accordance to the solutions of problems and limitations previously expressed, the object of the present invention is to provide a versatile compensation system that can be adapted to most internal combustion engines. One that has been designed to supply variable volumes of clean and compensated air-oxygen, through an alternate, non-restrictive way, where the air flow is regulated by the engine's operative rotation (RPM), during different working conditions. Such compensation system should improve and make the appropriate corrections to the problems mentioned above.

SUMMARY OF THE INVENTION

These and other objects, which will become apparent upon a reading of the following specification and claims, are fully accomplished by the fuel consumption optimizer and exhaust emissions reducer system, from here on to be mentioned as "Air-Power Booster." This system is based on "The air-vacuum liquid compensation device" which is the highlight of the present invention.

The air-power booster is integrated by: 1) An observation device which indicates the flow and speed of air-oxygen entering via the intake manifold, all the way into the combustion chamber, allowing the engine operator or vehicle driver a visual observation of the air speed coming into the engine, while at the same time it indicates the level of optimum fuel consumption. 2) Flexible tubing, valves, check, solenoids and accessories that regulate the air flow and allow the adaptation of the system to different sizes and models of engines, as well as to types of dispensator systems and fuels used. 3) The air-vacuum liquid compensation device or component booster of the system. The main function of this device is to allow the internal vacuum produced to aspirate constant variable volumes of air drawn from ambient air of positive pressure, that will easily overcome the surface tension of the liquid found in the interior of the compensation booster, assisted by the negative pressure of the vacuum present in the opposite side of the liquid. It is important to point out that the only resistance that should be overcome by the air passing through, will be the one imposed by the surface tension of the liquid and this can be considered zero or null, when we consider that on one side of the liquid we find +15 PSI of the ambient pressure and on the opposite side −20 PSI of the vacuum pressure. Additionally, the liquid will act as a filter, retaining all the extraneous particles transported by the air. This is an additional and secondary function of the liquid. As a result of this process, an additional current of clean and compensated air will flow constantly in variable volumes, dependent on the operative rotation (RPM) and the volume of the total internal displacement of the engine. The additional compensated air current enters directly to the intake manifold, filling partially the internal volume of the engine, allowing it to work in highly ventilated conditions, more open to the atmosphere reducing the conditions of extreme-closed high vacuum, without failures or malfunctions with quick response to develop torque and additional power, even under conditions of required effort and heavy work. All of this is possible without affecting the functions of valves, devices, accessories dependent from the vacuum which will continue to work in the same way. (Ex. distributors advance or (push), shift box valve, air conditioned accessories).

The objectives fulfilled by these new operative working conditions, produced by the constant presence of variable mass-volumes of additional air compensated in the internal volume (space) of the engine, imply advantageous changes in the new performance of the engine. Bestowing to the air-power booster characteristics that separate it, in a very distinctive and ample manner, from all others included in the prior art, while at the same time conforming to the uniqueness of this invention, as explained below:

1. Significant reduction of the fuel. Per se. As we know, all the volume of vaporized fuel (A) that reaches the combustion chamber is aspirated, transported and mixed by the restricted volume of air supplied through the dispensator system. Obviously, the volume of fuel (A) will be proportional to the volume of air (B) by the dispensator system in a restrictive way. Since the booster does not impose any restriction and, furthermore, facilitates the intake of additional air (B), supplying it directly to the intake manifold in a compensated way. This will imply that most of the aspirated air will be entering mainly through the "booster".

This new and advantageous operative event, will allow the restrictive flow coming from the dispensing system, such as the mixture of air-fuel, to become dependent and manageable (under control) by the non-restrictive flow of compensated air originated by the "booster." To a greater flow of compensated air there will be less flow of the restricted mixture or air-fuel, and vice versa: to a lesser flow of compensated air, one will obtain a greater flow of the restricted mixture of air-fuel. It is pertinent to make clear that the concept we have just explained, has been tested and proven correct, in engines equipped with dispensator systems, such as carburetors, fuel-injection, air-natural gas mixers, dosifiers where the vacuum and air flow are responsible for the sucking or extraction of fuel from venturis, injectors, caterers or sprinklers of the dispensator. For injection systems, where the fuel is supplied in pre-determined volumes controlled by computers, or injected directly to the combustion chamber, we must not to expect a reduction of fuel per se. For these cases the expected reduction of fuel consumption will be derived from all the advantages and improvements produced by raising volumetric and combustion efficiencies.

On the other hand, the visual observation device which indicates the speed of flow of air entering the "booster," as we have mentioned, offers the distinct advantage to observe in real time the degree of optimum consumption of fuel. This aids the operator in reaching the best operative efficiency of the engine.

2. It is very important to highlight that the reduction of fuel consumption per se, involves, in an implicit way, a loss of engine power, but this has been canceled and overcome by the new operative conditions of the engine, where the constant presence of variable masses of fresh compensated air coming from the "booster," which allow a significant increase of the volumetric efficiency of the cylinder's inner space and a significant reduction of the negative work-effort of the pistons, which now can intake suctioning from a partially open space of atmospheric conditions and not from the closed-in space under high-vacuum conditions. All this translates into an increase of torque and power, produced by the maximum quantity of energy efficiently generated with a minimum volume of fuel. In this way we have explained the reasoning as to how the air power booster allows a significant reduction of fuel consumption while at the same time it allows an increase in the torque and power of the engine.

Furthermore, the constant presence of additional fresh air, promotes the reduction of peak temperatures during combustion by substantially avoiding the combination of oxygen and nitrogen, which form at high temperatures, nitrogen oxides (NOx emissions) which are expelled to the environment as highly contaminating emissions.

3. Another no less important characteristic due to the presence of additional air in the internal volume of the engine is constituted by the dispersive action and turbulence factor created by the constant presence of additional compensated air, which will receive the influx of mixed restricted air-fuel from the dispensator system, and which will be dispersed and distributed equally in the combustion chamber, thereby obtaining uniform combustion and energy production. Similarly, the volumes of additional air provided by the "booster" will increase significantly the volumes of additional oxygen that will permit the optimization of the efficiency of the combustion, minimizing the formation of carbon deposits and providing a drastic reduction of carbon monoxide and hydrocarbon residues deriving from the burned fuel obtained by the optimal ratio of oxygen-fuel.

4. Finally, another characteristic of the air-power booster is due to the fact that the system works mainly by correcting the operational limitations that increase the engine efficiency and furthermore improving the efficiency of the combustion. This implies that the system may use any fuel. On the other hand, it is the only system based on the principle of Liquid Compensation of Pressures that allow the intake of compensated air-oxygen without causing engine failure by decompensation. The "Booster" reduces the high negative pressure of the vacuum, and the specific values for each engine model and type of fuel, are determined according to their size internal displacement and vacuum values previously measured before the installation of the system.

DETAILED DESCRIPTION OF THE PREFERRED EMBODIMENTS

Figure 1:
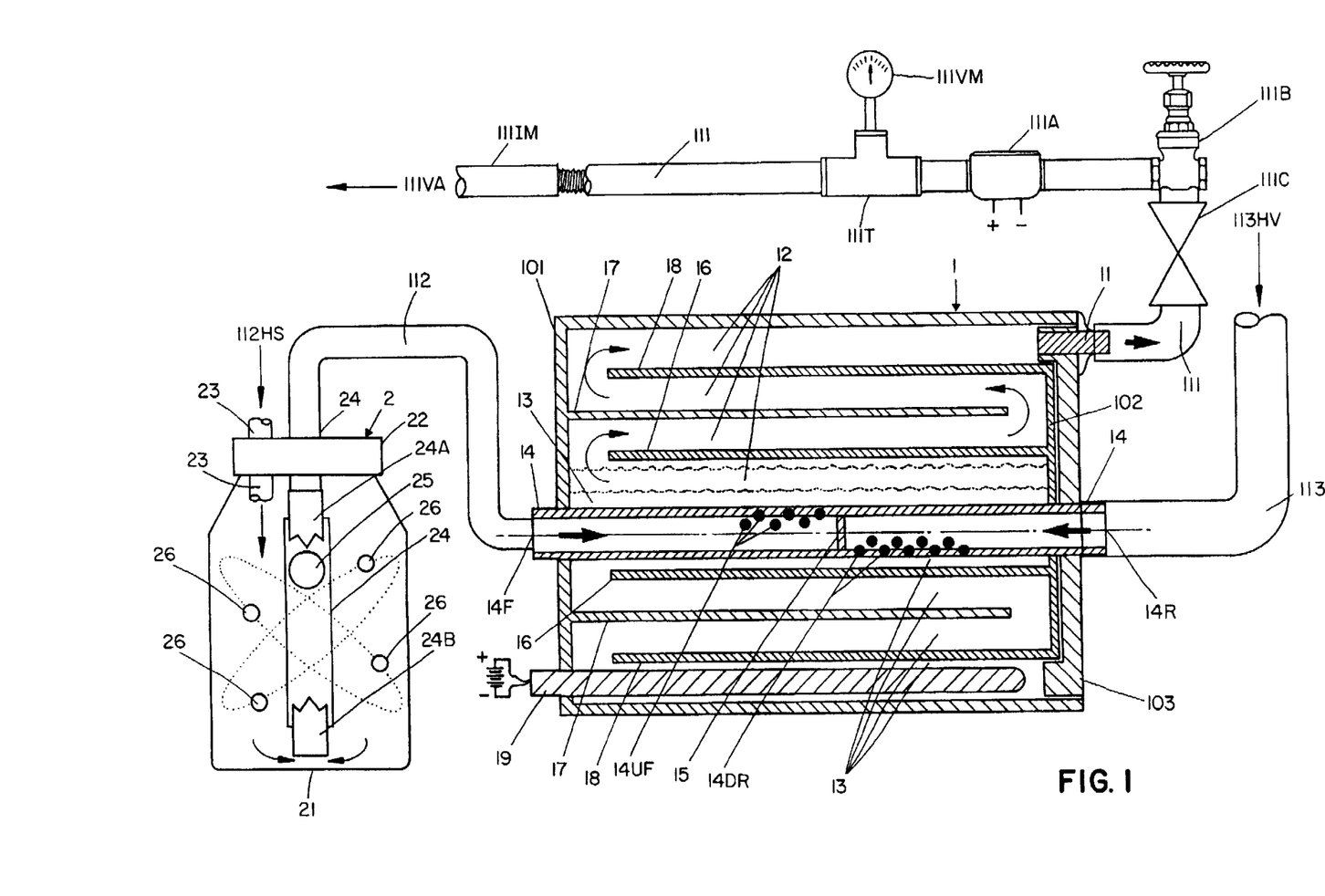
FIG. 1. is a longitudinal sectional view showing a schematic air flow passing through an air-power booster system of the invention as it continues towards the intake manifold of an internal combustion engine (not shown).
Figure 2:
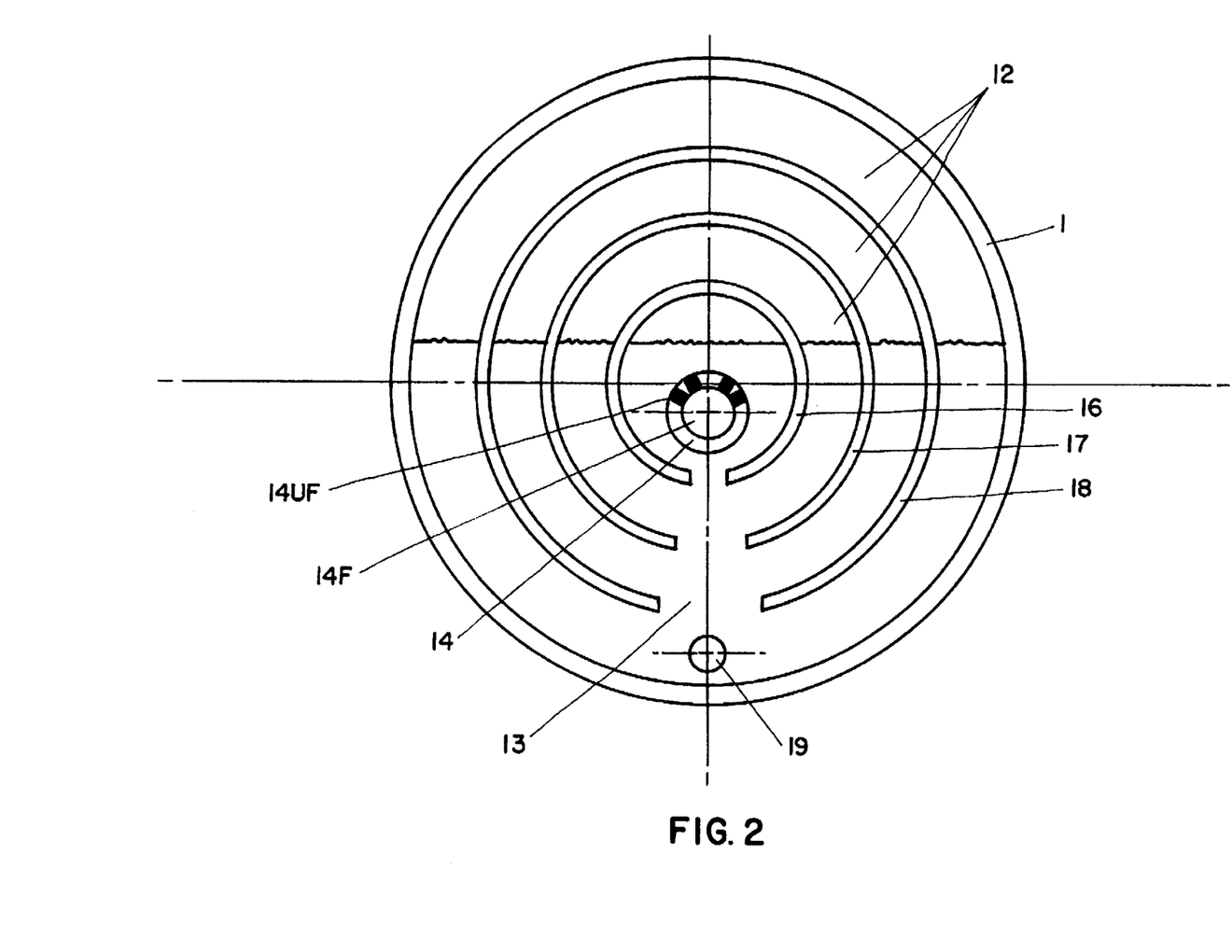
FIG. 2. is a front sectional view of the booster showing the front central tubing air inlet, inner walls, liquid level, and heater element, in accordance with the invention.
Figure 3:
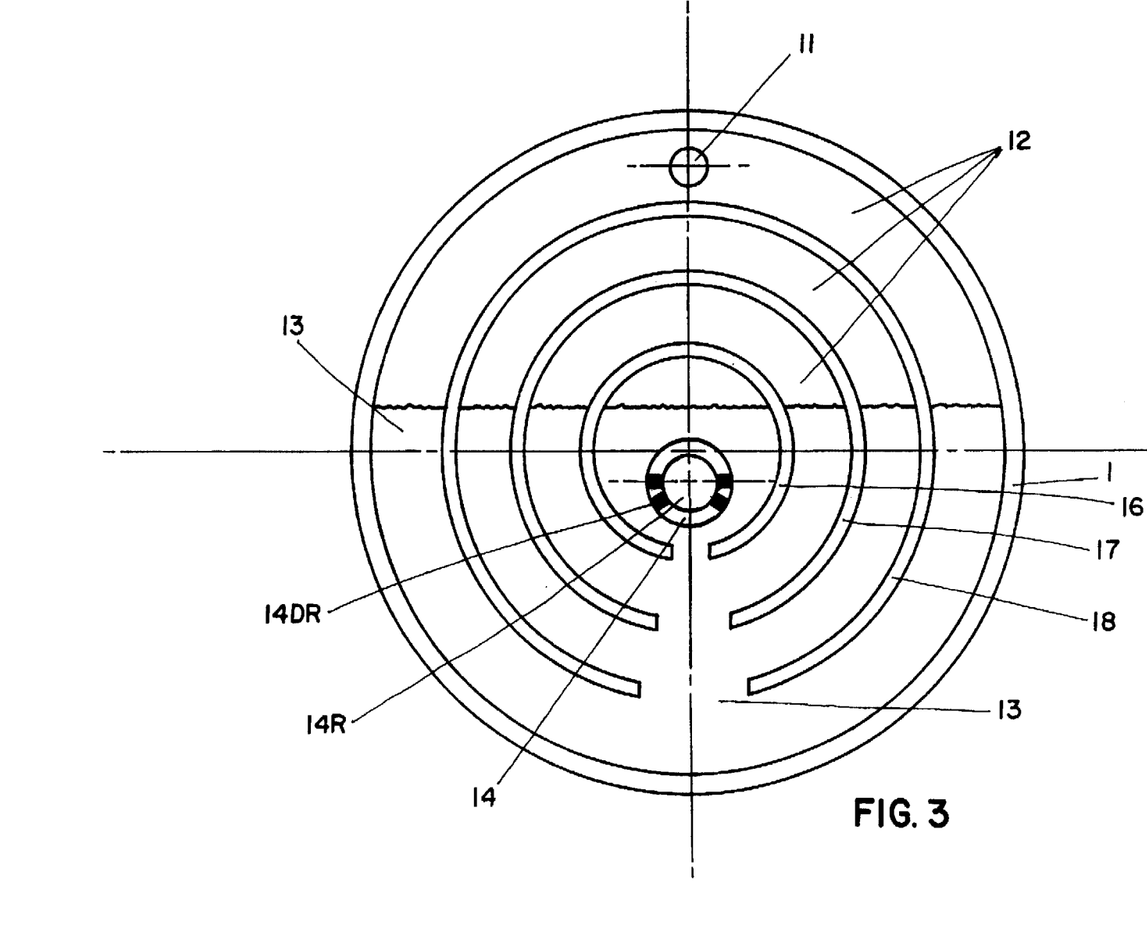
FIG. 3. is a rear sectional view of the booster showing the rear central tubing air inlet, upper vacuum-air outlet connector line towards the intake manifold (not shown), inner walls and liquid level, in accordance with the invention.

FIGS. 1, 2 and 3 show an air-power booster which includes an air-vacuum liquid compensation device 1, an air speed indicator device 2, and accessories to control and regulate the air-vacuum line 111, which allow adequate calibration, installation and use of the system in different types of internal combustion engines.

1) The air vacuum liquid compensation device 1, called in short the booster 1, has a cylindrical shape and is made up of two cylinders which interlock to make the unit. Exterior unit 101 is 90 mm in internal diameter. Interior unit 102 has an internal diameter of 66 mm. Each one has one end closed and contains an internal cylindrical tube open on one side opposite to a closed side. This design allows both units, cylinder 102 inside cylinder 101, to fit snugly into each other with an internal peripheral opening measuring 10 mm forming a gap, which permits the cover 103 to couple by pressure and centering all three pieces, 101, 102, and 103, and having an opening of 12.85 mm internal diameter perforated eccentrically in such a way that they will be placed below the horizontal axis. Each opening lodges a tube 14 measuring ⅜"ID-½"outer diameter, open at each end 14F, 14R (external to the booster 1, front and rear) but closed transversely by a division 15 which splits tube 14 into two independent sections which communicate with the inside of the booster through small openings of 2.5 mm internal diameter, located at both sides of the transverse division 15: twelve openings (orifices) at 25°, 65°, 295° and 335°, respectively, to a vertical axis shown as 14 UF in FIG. 2; and eighteen openings at 90°, 130°, 230° and 270° with respect to the vertical axis shown as 14 DR in FIG. 3.

The tubular section 14F-14UF is joined on the outside, to the flexible tube 112 coming from tube 24 fluidly connected to the lower end 24B of indicating device 2 for air flow speed, connected to the ambient atmosphere through tube 23, through which the ambient air 112 HS enters at a very high speed. Similarly, the tubular section 14R-14DR is joined to the flexible tube 113 which conducts the high volume of ambient air flow 113 HV optionally climatized to the most appropriate temperature for the engine; since it can be taken internally: from the air purifying filter, from the air conditioning evaporator, or from the heating system. In addition to the cover 103 forming the rear of booster 1, the connector 11 measuring ⅜ "outer diameter is connected, joined by transparent flexible tube 111 to the control-regulating valves for the air flow: solenoid 111A, valve 111B, check 111C, and optional vacuum meter 111VM installed on a T-junction, each having ⅜ "outer diameter and conforming the vacuum source-air outlet line 111VA which ends with the connector 111IM of the intake manifold. In some cases there is no connection available in the intake manifold for line 111VA. As an alternative, the connection can be made by placing a T-junction in the positive crank case ventilating system (PCV standard/all engines), the vacuum source-compensated air outlet line 111VA supplies the negative pressure of the vacuum to the connector 11, aspirating freely the internal volume 12 available from the booster 1, equivalent to 45% of the total volume of the booster 1, since the rest 55% is occupied by the volume of the liquid compensator 13, where tube 14 is submerged at a depth of 5 mm below the surface of the compensation liquid 13. Since the starting engine produces a vacuum pressure equal to aspiration −20 PSI above liquid surface, and 5 mm below it, there atmospfera by lines 112 front, 113 rear. Both these pressures are of contrary sign but they act in the same sense, due to the vacuum −20 PSI aspires up wards and the atmospheric air +15 PSI pushes downwards towards the surface, separated by the resistance of surface tension provided by 5 mm of compensation liquid which can be considered in total to be null or zero. Therefore, the result will be the instant creation of two ambient air currents supplied by the flows 112 HS and 113 HV, that enter freely sections 14F-14UF and 14R-14DR crossing across the liquid by way of 30 minor air flows running to the internal walls in the lower middle and upper sides of the first deflector pipe 16, which encloses internally, all the violent turbulence produced by the passage of 30 minor air flows across the liquid.

The total volume of air generated by the 30 air flows displaces upwards an equivalent volume of liquid, raising the internal liquid level. For this reason none of the 30 air flows are directed to the vertical inferior axis, where we find a longitudinal cut 6 mm wide running along the bottom of the pipe 16 for the purpose of replacing and recycling the volume of displaced liquid. The constant turbulence of the air-liquid mixture exits through the opening at the extreme side of the deflector pipe 16, 26 mm ID which ends up inside the closed end of a second deflector pipe 17 which is round shaped with 46 mm internal diameter and with an open end pointing to the cover 103 to end up inside the closed extreme of a third circular deflector pipe 18 of 66 mm internal diameter which also has only one open end, opening toward the extreme front 101 of the cylindrical shaped interior of the booster, and finally the compensated air flow goes to the upper connector 11 located at the rear cover 103.

This configuration permits the separation of the initially turbulent mixture of air-compensation liquid, where the obligatory route of air volume travels through the deflector pipes, is unballasted by gravity and adherence of the liquid to the walls of the deflector pipes, assuring the constant exit of a high volume of air, free of extraneous particles and any liquid, retained in the booster 1.

The upper connector 11 joined by a translucent pipe 111, allows visual observation of the cleanliness of the flow 111VA which supplies the high volume of clean air that enters the intake manifold. Additionally, all the deflector pipes have a 9 mm internal separation between them, and 10 mm front/rear, and a longitudinal cut that permits the recycling of the liquid. In the lower inferior extreme (terminal) front of exterior unit 101, a thermostatic heater regulating unit 19 is located, which insures the appropriate temperature necessary to keep the viscosity and fluidity of the inert liquid 13 at an appropriate level during cold weather (below freezing temperatures). The heating unit 19 acts jointly with the solenoid valve IIIA, during the initial ignition and engine warming, deactivating the air power booster during cold starting conditions.

It is important to point out, that the booster works under a wide pressure differential, explained by the action of both ambient pressure and vacuum working in a single way For example, even during acceleration where the vacuum internal negative pressure drops as low as −3 PSI is valve aspirates internally, suctioning from the top or surface of the liquid, but the ambient pressure +15 PSI continues to be present below the liquid, implying an action of push and pull in the same way, greater than the real numeric value of the resulting pressure of +12 PSI. During several gauging and measuring tests which were made, we have found the range of vacuum pressure inside the booster by connecting a vacuum meter directly to the exit outlet 11 and have obtained values −4 PSI and −9 PSI under normal conditions of acceleration and deceleration.

During conditions of maximum acceleration (full throttle open) such values reach −2 PSI and come close to 0 (zero) PSI where the engine behaves as any normal motor without the air-power booster.

2) Here lies the importance of the speed and air flow device 2 connected remotely by the flexible pipe ¼" internal diameter, located at the extreme end 14F of the central pipe 14 of the booster. This indicating device permits the visual observation of the speed of the ambient air flow entering constantly into the booster 1. The indicator device 2 includes a transparent cylinder 2" outer diameter and by 3" in height, sealed at its bottom end 21. The top of this cylinder 22 includes 2 tubes: the first located centrally inside is transparent 24 tube 5/16 "outer diameter and 2" in height. Each end carries a small peak which have been designed to make contact with a metal sphere 25, but without obstructing the flow of high speed air. Both of these internal peaks 24A at the top and 24B at the bottom end are fluidly connected: 24A is connected to the flexible pipe coming from the end 14F of the central pipe 14 of the booster, and 24B is connected to the inside of the transparent cylinder 2, which receives the ambient air through the top pipe 23, ¼" outer diameter reduced internally to ⅛" outer diameter, in the shape of a sharp peak in direct contact with the ambient atmosphere. The negative pressure of aspiration coming from the end 14F fluidly connected by line 112 with pipe 24 will reach the bottom peak 24B, subject to vacuum centrally from the inside bottom 21 of the transparent cylinder 2 where several small lightweight spheres 26, move randomly describing visually discernibles orbits, similar to those made in atoms. This orbital movement is produced by the strong turbulence and subsonic speed of the ambient air that flows 112HS from the top end of pipe 23 into the bottom end 24B intaking such magnitudes of volumes of subsonic air that the metal sphere 25 will float in an antigravity fashion, keeping a constant rotating movement but always trying to keep contact with top end 24A. Both spheres, metal sphere 25 and lightweight spheres 26 are very sensitive, showing the changes of turbulence, speed, and air flow being subject to vacuum remotely from end contact 14F of the booster 1; allowing a visual check of the decrease of volume-air speed and the diminishing negative vacuum pressure. This can be observed by the initial reduction of the speed of the lightweight spheres 26, followed by the internal falling of the metal sphere 25 towards the bottom peak 24B, and in the case of maximum acceleration (full throttle open), the total paralyzation of the lightweight spheres 26 at the bottom end 21 of the transparent cylinder 2. With a greater air flow and volume of compensated air coming from the booster, less flow of mixed fuel-air comes from the fuel dispensing system. Thus, if we can operate the engine while watching the metal sphere floating upwards and the small lightweight spheres maintaining continuous orbits, we are sure to be obtaining an optimum degree of reduction in fuel consumption. This observation device 2, can be installed inside the vehicle on the dashboard, or in the case of a stationary engine, it can be installed at a remote distance, to allow a visual check of the optimum degree of fuel consumption. On the other hand, the displacement of the metal sphere 25 could be registered by electronic means, using a gauge or lighted indicator that indicates the same principle of fuel consumption optimization.

3) LIQUID COMPENSATOR 13. This liquid performs an important function as the separating medium of the two opposite pressures: vacuum negative and ambient positive, each with a different sign but acting in the same sense, this fact offers the booster 1 a wide range of work enabling booster 1 to supply additional air-oxygen with negative vacuum pressures as high as −30 PSI and as low as −3 PSI, which is the minimum limit for the engine to perform similarly to any other engine without the booster.

The only resistance to the air flow as it goes through the liquid of the booster 1, is that produced by the surface tension of the liquid, its density and viscosity, which will be affected by the working temperatures. The selected liquid must carry out the compensation process under any climatic working conditions.

Example: mineral oil is very adequate to work at below zero temperatures, since it does not freeze and keeps an appropriate viscosity. Any engine oil SAE 30 gives results which are appropriate in more benign climates. Where temperatures may run above 100° F., it would be recommended to use engine oil SAE 50-60. The compensation liquid is never consumed, but it is convenient to replace it in order to discard any dust particles retained and accumulated at the bottom of the booster. The translucent flexible hoses allow a visual observation of the internal level and liquid condition (engine off). To replace the liquid, all that must be done, is to disconnect the booster unit, place it upside down and empty its content through connector 11. Later, the booster can be filled again, up to the marked level.

ADDITIONAL USES OF THE BOOSTER

The properties of each particular liquid, allow the booster 1 to be used as a way to supply high concentrations of extra oxygen. Methanol ($CH_3OH$), which is volatile and inflammable, contains 50% of molecular oxygen, and may be used in the booster as a compensator liquid. It will allow a flow of air, which provides a load of 50% of extra oxygen entering the combustion chamber. Therefore, the booster will behave as a chemical supercharger, mostly applied in modified sport engines. For this special use, the booster must have an optional accessory to constantly replace the volume of methanol being consumed by evaporation. In the same way, the booster can be used to supply any chemical liquid having properties which can be advantageous due to their intrinsic physical/chemical characteristics.

Although a preferred embodiment of the invention has been herein described, it will be appreciated that some changes in structure can be effected without departure from the basic principles of the invention. Such changes are deemed to be included in the spirit and scope of the invention as defined by the appended claims and equivalents thereof.

What is claimed is:

1. A fuel consumption optimizer and exhaust emissions reducer for an internal combustion engine including an air-vacuum liquid compensation device comprising:

means for supplying a first stream of air at high speed and a second stream of air at high volume through respective channels into a booster container; and means for passing said first stream of air and said second stream of air through a plurality of openings in said respective channels into a body of liquid in the booster container.

2. A fuel consumption optimizer and exhaust emissions reducer according to claim 1, further comprising:

means for passing said air leaving the liquid in the booster container under vacuum through an intake manifold of the engine;

means for forming an air-fuel mixture which is rich in air; and means for combusting said air-fuel mixture.

3. A fuel consumption optimizer and exhaust emissions reducer according to claim 1, wherein said respective channels are longitudinally coaxial and are separated by a divider therebetween.

4. A fuel consumption optimizer and exhaust emissions reducer according to claim 3, wherein said plurality of openings are located in side walls of said respective channels.

5. A fuel consumption optimizer and exhaust emissions reducer according to claim 1, further comprising an air flow and air speed indicator device.

6. A fuel consumption optimizer and exhaust emissions reducer according to claim 5, wherein the air flow and air speed indicator device comprises a container and means for permitting a stream of ambient air to enter the container at high speed.

7. A fuel consumption optimizer and exhaust emissions reducer according to claim 6, wherein the air flow and air speed indicator device further comprises a transparent tube through which the stream of ambient air flows into the container at high speed.

8. A fuel consumption optimizer and exhaust emissions reducer according to claim 7, wherein the transparent tube contains a sphere which floats antigravitationally in the stream of high speed ambient air.

9. A fuel consumption optimizer and exhaust emissions reducer according to claim 7, wherein the air flow and air speed indicator device further comprises a plurality of lightweight spheres disposed in the container outside said transparent tube for indicating air flow.

10. A fuel consumption optimizer and exhaust emissions reducer according to claim 1, wherein the booster container further comprises a thermostatic heater regulating unit.

11. A method for optimizing fuel consumption and reducing exhaust emissions in an internal combustion engine comprising:

supplying a first air stream of air at high speed and a second air stream at high volume through respective channels to a booster container;

passing said first air stream and said second air stream through a plurality of openings in said respective channels into a body of liquid in the booster container.

12. A method for optimizing fuel consumption and reducing exhaust emissions according to claim 11, further comprising:

passing said air leaving the body of liquid under vacuum through an intake manifold of the engine;

forming an air-fuel mixture which is rich in air; and combusting said air-fuel mixture.

13. A method for optimizing fuel consumption and reducing exhaust emissions according to claim 11, further comprising:

reducing hydrocarbon, carbon monoxide and nitrogen oxides in the exhaust emissions of said internal combustion engine; and improving volumetric and combustion efficiencies in said air-fuel mixtures.

* * * * *